(12) United States Patent
Young

(10) Patent No.: US 7,104,556 B1
(45) Date of Patent: Sep. 12, 2006

(54) COMBINATION MOP BUCKET AND TROLLEY

(75) Inventor: Scot Young, St. Joseph, MO (US)

(73) Assignee: Ronald Alexander (Scott) Young, West Midlands (GB)

( * ) Notice: Subject to any disclaimer, the term of this patent is extended or adjusted under 35 U.S.C. 154(b) by 557 days.

(21) Appl. No.: 09/588,778

(22) Filed: Jun. 5, 2000

(51) Int. Cl.
    *B62B 3/14* (2006.01)
(52) U.S. Cl. .................. 280/47.35; 280/47.38
(58) Field of Classification Search ............ 280/47.35, 280/47.38, 87.01, 204, 292, 411.1; D12/97
    See application file for complete search history.

(56) References Cited

U.S. PATENT DOCUMENTS

| | | | |
|---|---|---|---|
| 2,424,644 A | 7/1947 | Barrett | 280/79.3 |
| 2,555,178 A | 5/1951 | Young | 280/36 |
| 2,560,059 A | 7/1951 | Young | 280/47.35 |
| 3,504,392 A | 4/1970 | Baek | 15/260 |
| 3,874,531 A | 4/1975 | Mayo | 214/130 R |
| 4,319,761 A * | 3/1982 | Wells | 280/47.36 |
| 4,493,492 A | 1/1985 | Balabanova | 280/651 |
| 4,923,202 A | 5/1990 | Breveglieri et al. | 280/47.35 |
| D309,813 S | 8/1990 | Gingras | D34/27 |
| 5,110,147 A * | 5/1992 | Gershman | 280/79.5 |
| 5,326,117 A | 7/1994 | Cook | 280/79.2 |
| 5,860,659 A * | 1/1999 | Hart | 280/79.5 |
| 5,913,528 A * | 6/1999 | Kresse et al. | 280/47.35 |

FOREIGN PATENT DOCUMENTS

| | | |
|---|---|---|
| DE | 82 36 555.5 | 8/1983 |
| DE | 43 20 454 A1 | 12/1994 |

OTHER PUBLICATIONS

Rubbermaid catalog pp. 3, 49 50 circa 1998.
Crisp Clean Services Ltd flyer "The Maxi System" circa 1998.
Filmop Catalog circa 1998.

* cited by examiner

*Primary Examiner*—J. Allen Shriver
(74) *Attorney, Agent, or Firm*—Young & Thompson

(57) ABSTRACT

A combination mop bucket and trolley with an independent and detachable mop bucket is provided wherein the trolley and mop bucket each have separate wheels for independent movement. The trolley has a front recess to receive the mop bucket with the bucket remaining supported on the floor surface and without having to lift the mop bucket onto the trolley. A connection mechanism extends between the trolley and the mop bucket to selectively attach the mop bucket to the trolley so that the combined trolley and bucket can be easily maneuvered by one person.

5 Claims, 4 Drawing Sheets

COMBINATION MOP BUCKET AND TROLLEY

FIELD OF THE INVENTION

This invention relates to mop buckets and service carts or trolleys for mop buckets.

BACKGROUND OF THE INVENTION

Maintenance workers often use mops and mop buckets for cleaning floors. The maintenance worker must also carry around with him or her an assortment of cleaning supplies including spray bottles, towel racks, trash receptacles or other cleaning items suited to the type of maintenance/cleaning to be performed. The prior art identified in the Information Disclosure Citation contains many references to cleaning trolleys or service carts which have a platform on the lower ledge of the cart onto which a mop bucket may be lifted and set down so that the mop bucket can be wheeled from room to room as in a hotel/motel setting or wheeled about a service area, as in a restaurant operation. The mop bucket can be heavy and particularly in the case of a person of small stature, may be beyond that person's capability to lift the mop bucket and set it on the cart.

Applicant has conceived that what is desired is a mop bucket and trolley combination in which each may be configured to roll about the floor independently yet combined when desired so that they may be wheeled about a service area as a unit. The connection must be easy, simple, and not require bending over or parts which must be disassembled in order to connect or disconnect the mop bucket from the cart or trolley.

OBJECTS OF THE INVENTION

The objects of the present invention are to provide a combination mop bucket and trolley which does not require lifting the mop bucket onto a trolley base tray; to provide such a combination mop bucket and trolley in which the mop bucket can be rigidly connected to the trolley so that the combined bucket and trolley can be wheeled sharply around obstacles and corners; to provide such a combination mop bucket and trolley in which it is easy for a user to attach/detach the mop bucket from the trolley; to provide such a combination mop bucket and trolley which is easy to use, economical and well suited for the intended purpose. Other objects and advantages of the invention will become apparent from the following description.

Description of the Preferred and Alternate Embodiments

As required, detailed embodiments of the invention are disclosed herein, however, the invention may be embodied in various forms in differing arrangements for configuration of parts.

Figure 1:
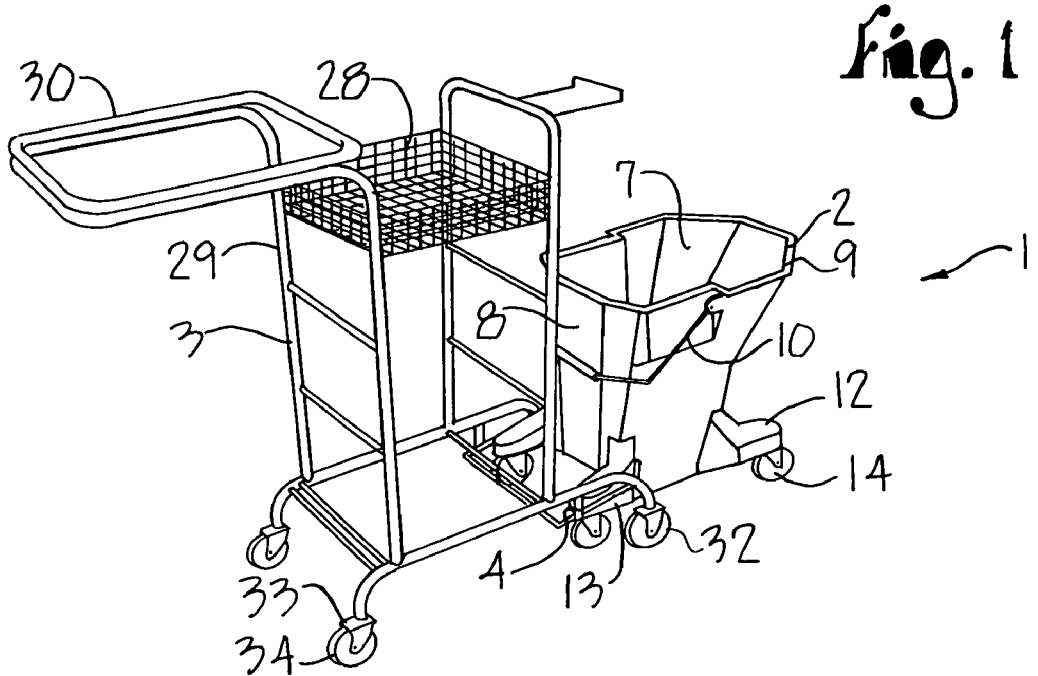
FIG. 1 is a perspective view of a combination mop bucket and trolley embodying the present invention.
Figure 2:
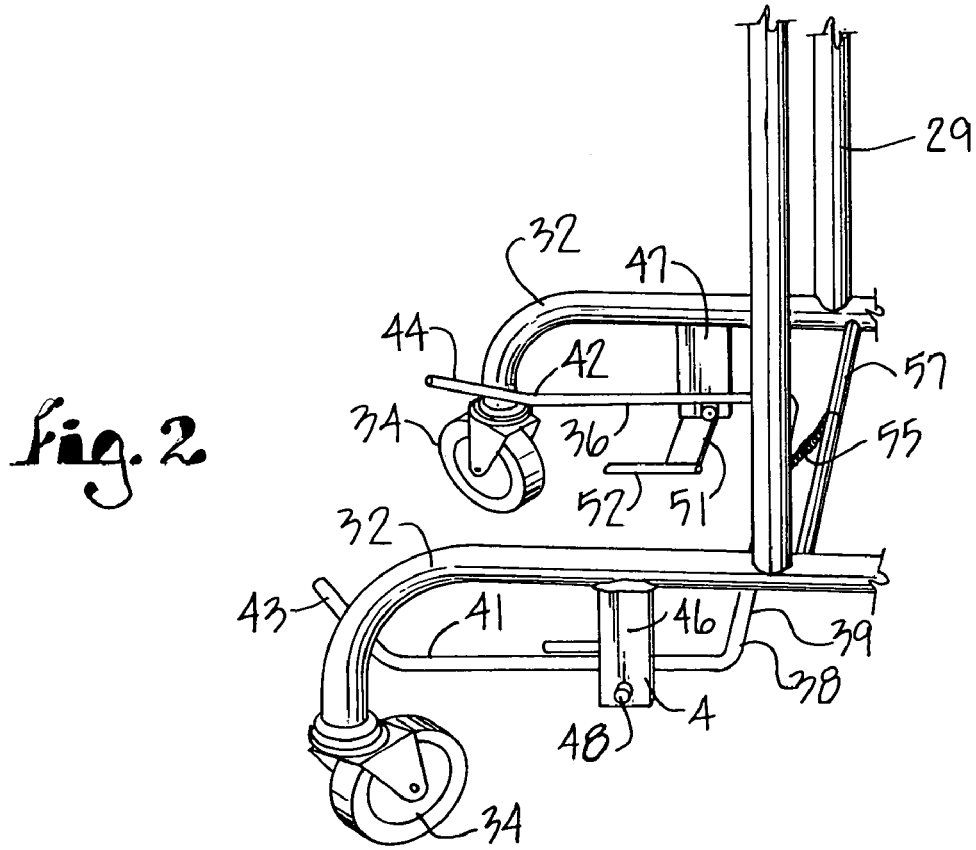
FIG. 2 is an enlarged, fragmentary perspective of the front of the trolley into which the mop bucket is positioned.

The referenced numeral 1, FIG. 1, generally indicates a combination mop bucket and trolley embodying the present invention. The invention consists of a wheeled mop bucket 2 and a wheeled cart or trolley 3 with a connection means 4 extending therebetween and selectively attaching the mop bucket 2 to the cart or trolley 3.

In greater detail, the mop bucket 2 comprises an open receptacle or bucket portion 7 with a rear straight wall 8 and a front pour spout 9. A handle 10 is provided for grasping the bucket. The method is supported on front and rear pairs 12 and 13 of outrigger legs which end in caster mounted wheels 14. This design of mop bucket 2 has been manufactured for many years by applicant Scot Young Research, Inc.

Figure 3:
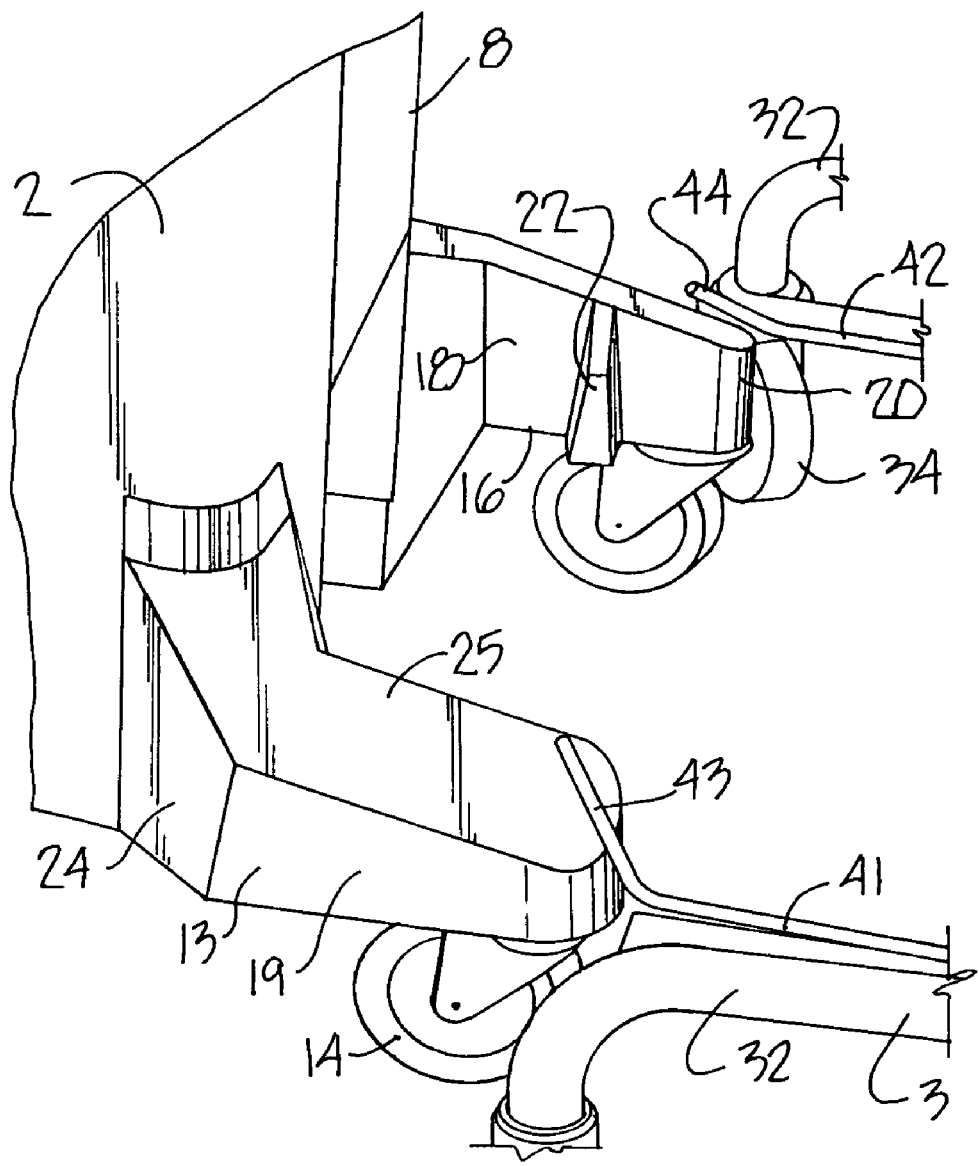
FIG. 3 is an enlarged, fragmentary view showing a step of connection of the mop bucket to the trolley.
Figure 4:
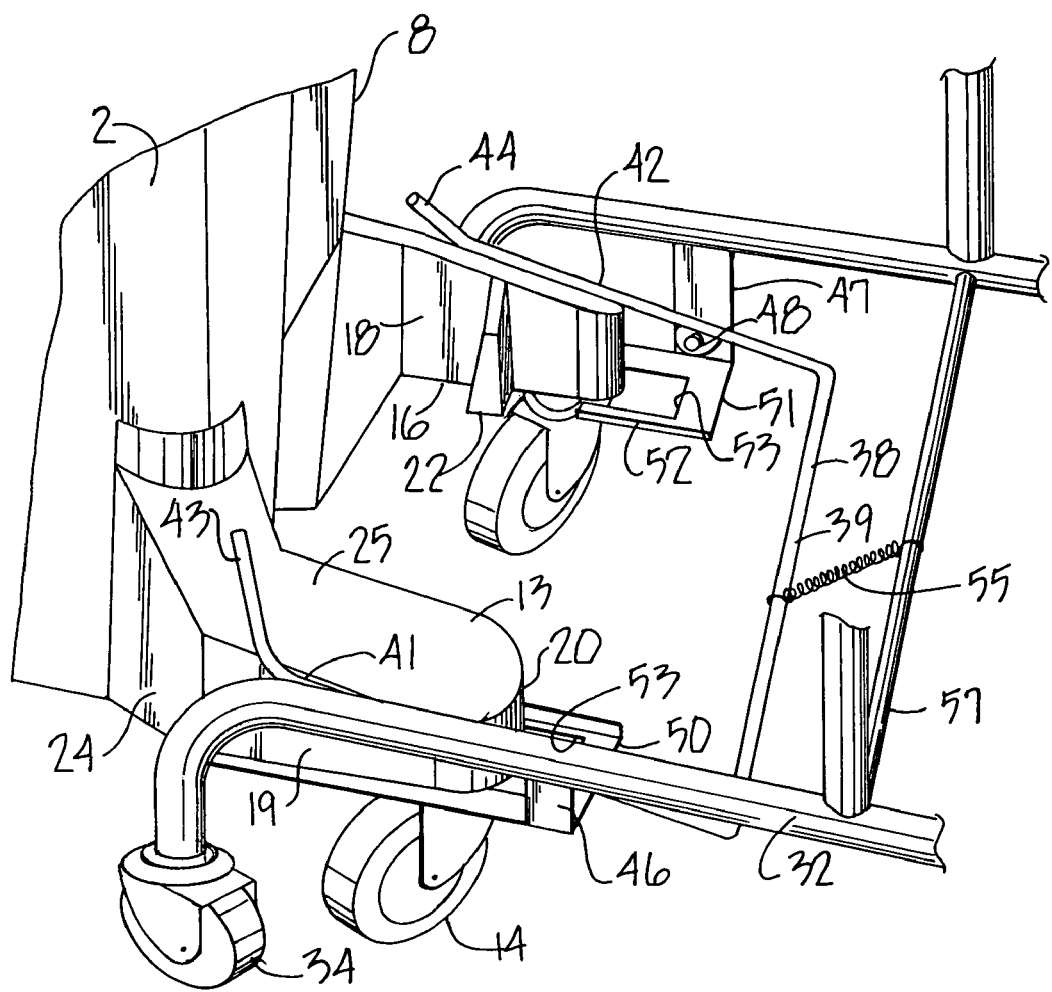
FIG. 4 is a sequential view with FIG. 3 showing connection of the mop bucket to the trolley.
Figure 5:
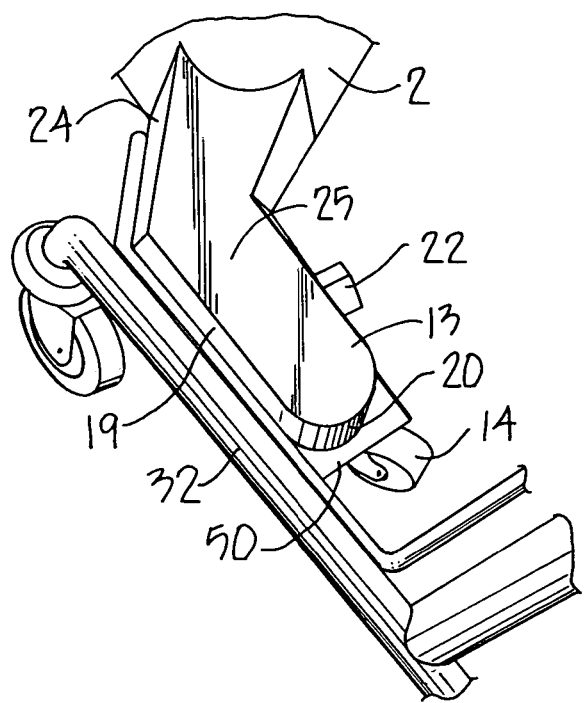
FIG. 5 is a perspective, fragmentary view of the mop bucket and trolley showing the same fully joined.
Figure 6:
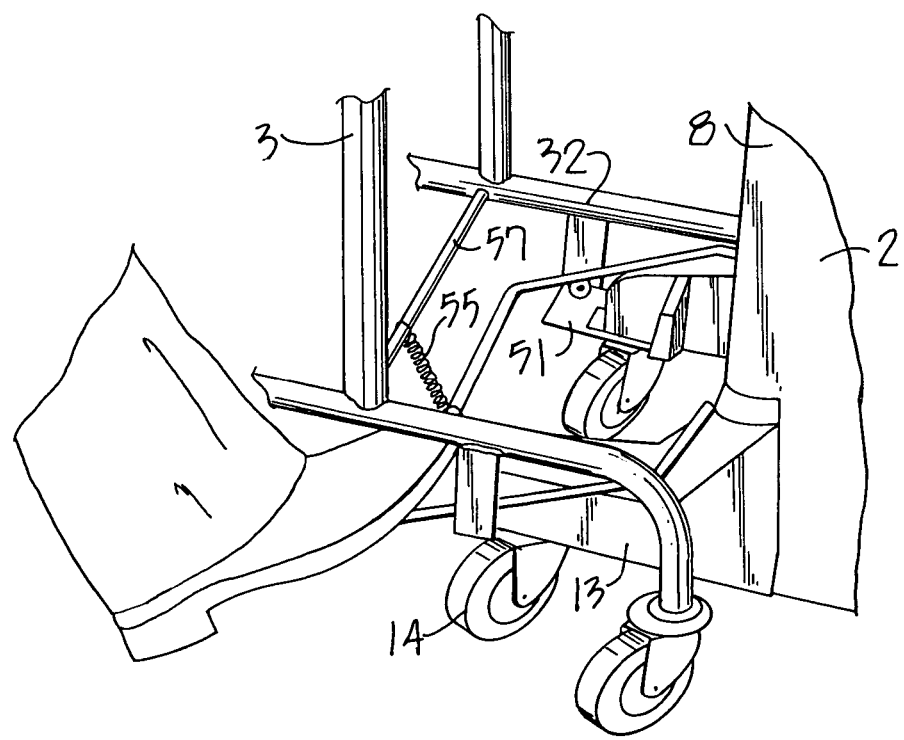
FIG. 6 is a fragmentary, perspective view showing the manner of disconnection of the mop bucket from the trolley.

More details of the mop bucket are shown in connection with FIGS. 3 and 4, wherein is shown in fragmentary view a portion of the rear of the bucket 2 and the rear pair of outrigger legs 13. The outrigger legs 13 are the ones that engage with the cart or trolley 3, because the pour spout 9 at the front of the mop bucket 2 would generally interfere with connecting the mop bucket 2 to the trolley 3 via the front of the mop bucket 2. The legs 13, as well as the front legs 12, extend outwardly from the body of the bucket portion 7 with the wheels 14 supported at the end of the legs. The legs 13 have a flat bottom 16 and inner and outer faces 18 and 19. Ends 20 of the legs are rounded. A vane 22 extends outwardly from the innerface 18 and serves as a stop for the connection means of the trolley as described below. Each of the pairs of the front legs and rear legs 12 and 13 are parallel to each other and include an angled face portion 24 extending outwardly from the bucket portion 7 and providing a face against which the trolley connection means is engaged. The tops 25 of the legs 12 and 13 are angled upwardly.

The cart or trolley 3 may be of various configurations and of various materials. In the illustrated example, it is formed of tubular steel members; however, it could be formed of plastic, as plastic carts have become popular. The cart 3 includes one or more shelves 28 which may be in the form of wire baskets and which are supported by upright members 29. A rear handle 30 is connected to rear upright members 29 and is for manipulation and pushing by a maintenance worker. The cart or trolley 3 is supported on front and rear pairs of arms 32 and 33 supported by castered wheels 34. The rear pair of arms 33 support the cart or trolley 3 at its rear with the front pair of arms 32 extending forwardly a sufficient distance to form a recess into which the mop bucket 2 is received. The front pair of arms 32 are spaced apart a sufficient distance also to receive the mop bucket 2 therebetween, FIG. 1. In the illustrated example, the arms 32 are of tubular steel with an end radius downturn terminating in the caster wheels 34.

The connection means 4 is supported within a recess 36 at the front end of the cart or trolley 3 defined by the front pair of arms 32. In the illustrated example, the connection means 4 is a mechanism including a generally U-shaped member 38 formed of bent steel rod. The U-shaped member 38 includes a central portion 39 and spaced limbs 41 and 42 with inwardly angled end terminations 43 and 44. The U-shaped member 38 is pivotally suspended from hangers 46 and 47 extending downwardly from each of the arms 32 and connected via pivots 48. Stop arms 50 and 51 connect to the bottom of the hangers 46 and 47 and each include guide fingers 52 which form a slot 53 to receive the bucket leg ends 20. The U-shaped member 38 is biased toward a downward position by a return spring 55 extending between the central portion 39 and a cross-bar 57.

In use, the combination mop bucket and trolley 1 is connected together by positioning the mop bucket 2 into the recess 36 in the front of the cart or trolley 3. The mop bucket 2 may be pushed into the recess 36 so that the legs 13 slide into the slots 53. At the same time the leg ends 20 are sliding into the slots 53, the angled end terminations 43 and 44 of the limbs 41 and 42 are sliding upwardly on the angled top surface 25 of the legs 13 until reaching the angled sidewall 24, whereupon they snap downwardly by the biasing of the spring 55. The mop bucket 2 is now securely connected into the cart or trolley 3 with forward movement or movement into the cart or trolley stopped by the stop arms 50 and 51 and outward movement stopped by the bearing of the angled end terminations 43 and 44 on the angled sidewalls 24. To release the mop bucket 2 from the cart or trolley 3, the U-shaped member 38 is pressed down, as by a foot, on the central portion 39 to extend the return spring 55 and raise the angled end terminations 43 and 44 from engagement with the angled side walls 24, allowing the mop bucket 2 to be slid forwardly with respect to the cart or trolley 3 and separated.

It will be apparent that the foregoing connection means is a no tool connection, whereby there are no pins or bolts or other fasteners for the user to connect to attach/detach the mop bucket to the cart or trolley. The user does not have to lift the heavy mop bucket and place it upon a front carrier or shelf of the cart, as was done with prior art devices. The bucket and the cart or trolley are able to be rolled about the floor separately. Once joined, there is a rigid connection between them so that a single person can guide the cart and bucket combination around sharp corners without concern about the bucket separating from the cart and spilling.

The disclosed invention has been described in a particular form, as is required to do by law, but other forms or embodiments may be developed which are within the concept of this invention. The invention is not to be limited to this specific form or embodiment described and shown except insofar as set forth in the following claims.

What is claimed and desired to be secured by Letters Patent is:

1. A detachable trolley and mop bucket combination comprising a mop bucket having wheels thereon and movable over a floor surface, and a trolley adapted for carrying cleaning supplies, the trolley having wheels thereon for moving over a floor surface, the trolley and the bucket being separately and independently movable and being stably supportable solely by the respective wheels when independent of each other, the combination having a connection between the trolley and bucket for selective attachment to securely connect the mop bucket to the trolley so that the combined trolley and bucket can be easily maneuvered by one person, wherein the trolley has spaced front legs terminating in wheels and forming a recess therebetween with the mop bucket dimensioned to fit at least a portion of the mop bucket within the recess.

2. The detachable trolley and bucket combination as claimed in claim 1, wherein the bucket is supported on front and rear pairs of outrigger legs with the wheels mounted at ends of the legs and wherein one pair of outrigger legs fit within the trolley recess.

3. The detachable trolley and bucket combination as claimed in claim 2, wherein a connection mechanism extends between the spaced front legs of the trolley.

4. The detachable trolley and bucket combination as claimed in claim 3, wherein the connection mechanism comprises a pair of arms that engage the outrigger legs of the bucket, the outrigger legs being angled and the engaging arms being shaped to match the angles of the outrigger legs, the engaging arms being biased to an engagement position by a spring and having a portion for contact with a person's foot so that a person may press downwardly upon the portion and disengage the arms from connection with the outrigger legs in order to remove the bucket.

5. A detachable trolley and bucket combination comprising:
   a) a mop bucket having front and rear pairs of outrigger legs terminating in wheels for independent movement of the bucket over a floor surface; the outrigger legs having inwardly angled faces joining the bucket;
   b) a utility trolley adapted for carrying cleaning supplies and having a frame supported by front and rear legs terminating in wheels for independent movement of the trolley over a floor surface, the front legs being spaced a distance for accommodating at least a portion of the mop bucket therebetween;
   c) a connection arrangement between the front of the trolley and the mop bucket and including engaging arms associated with the trolley front legs and configured to selectively grasp one of the pairs of bucket outrigger legs, the engaging legs releasing the outrigger legs upon application of foot pressure, wherein the bucket may be selectively joined to the trolley and wheeled about as a unit.

\* \* \* \* \*